United States Patent [19]
Brown et al.

[11] Patent Number: 4,524,316
[45] Date of Patent: Jun. 18, 1985

[54] SPEED REDUCING CONTROL SYSTEM WITH VOLTAGE REGULATION FOR A POLYPHASE ELECTRIC MOTOR

[75] Inventors: Herbert J. Brown; Thomas D. Stitt, both of Erie, Pa.

[73] Assignee: General Electric Company, Erie, Pa.

[21] Appl. No.: 540,728

[22] Filed: Oct. 11, 1983

[51] Int. Cl.³ .............................................. H02P 5/40
[52] U.S. Cl. .................................. 318/809; 318/727; 318/812
[58] Field of Search ............... 318/809, 812, 778, 727; 363/160

[56] References Cited

U.S. PATENT DOCUMENTS

| | | | |
|---|---|---|---|
| 3,307,094 | 2/1967 | Ogle | 318/341 |
| 3,665,273 | 5/1972 | Enslin | 318/809 |
| 3,826,960 | 7/1974 | Broadway et al. | 318/223 |
| 3,908,158 | 9/1975 | Studtmann | 318/227 |
| 4,070,605 | 1/1978 | Hoeppner | 318/227 |
| 4,078,190 | 3/1978 | Nash | 318/227 |
| 4,093,898 | 6/1978 | Morters et al. | 318/227 |
| 4,176,306 | 12/1979 | Asano et al. | 318/772 |
| 4,233,548 | 11/1980 | Kirtley, Jr. | 318/812 |
| 4,461,985 | 7/1984 | Stitt | 318/727 |

OTHER PUBLICATIONS

Low-Cost Electronic Speed Controller for Small Induction Motors by W. Matley, K. B. Clarke, and P. Marshall presented at the Second International Conference on Electrical Variable-Speed Drives in London, England on Sep. 25-27, 1979, (IEE Conf. Publ. No. 179, pp. 42–45).

Primary Examiner—David Smith, Jr.
Attorney, Agent, or Firm—Albert S. Richardson, Jr.

[57] ABSTRACT

A variable speed 3-phase a-c motor is connected via a plurality of controllable bidirectional switches to a 3-phase source of alternating voltage having a variable fundamental frequency (f) and an rms magnitude (v) that varies with f, and the switches are suitably arranged and controlled so that motor speed can be reduced by skipping selected cycles of the source voltage. When operating at a fraction of full speed, the magnitude-to-frequency ratio of motor voltage is maintained substantially the same as at full speed by varying the "firing angle" at which the switches start conducting current so as to minimize any deviation of the rms magnitude of the motor voltage from the product of v times said fraction.

15 Claims, 11 Drawing Figures

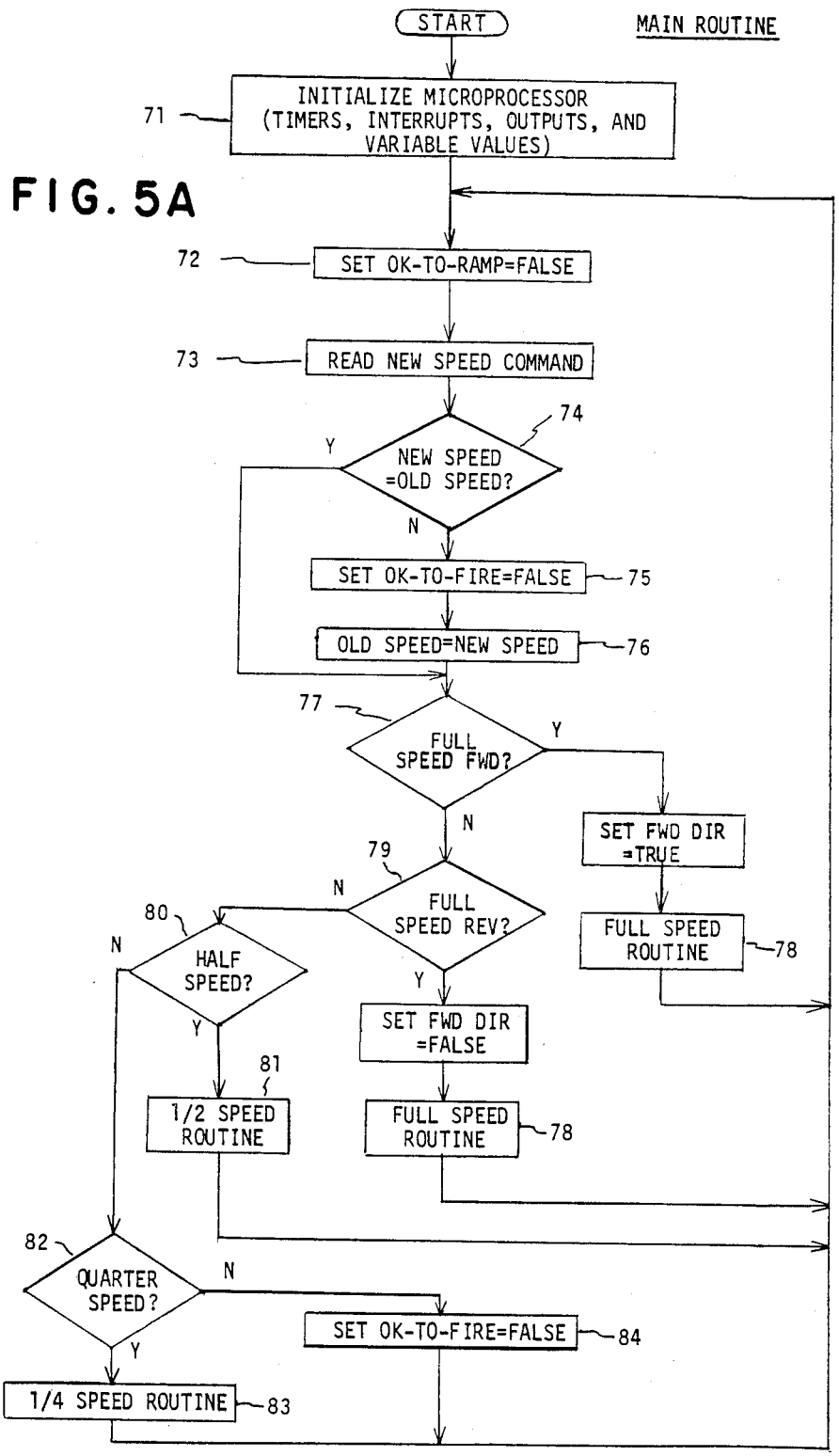

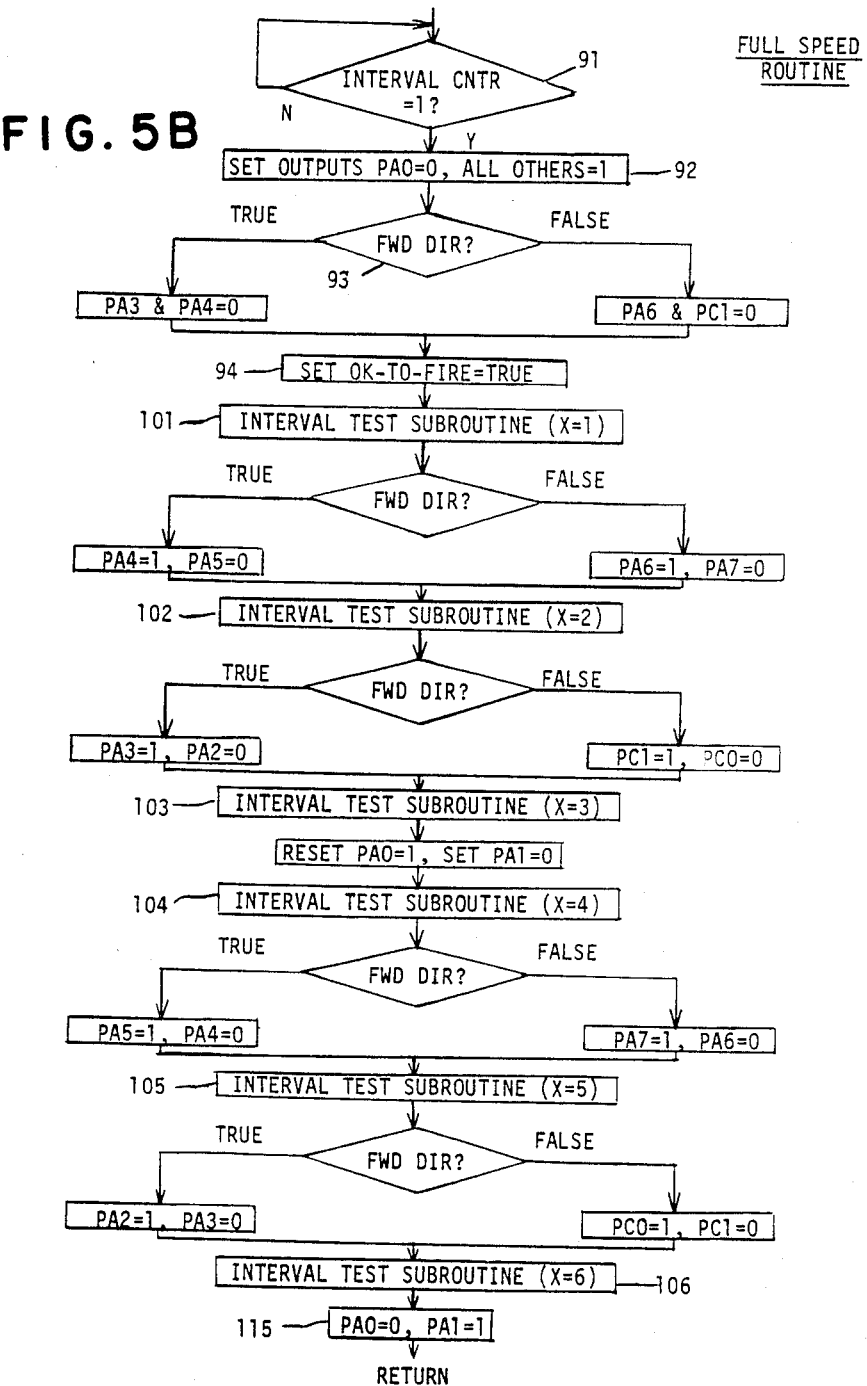

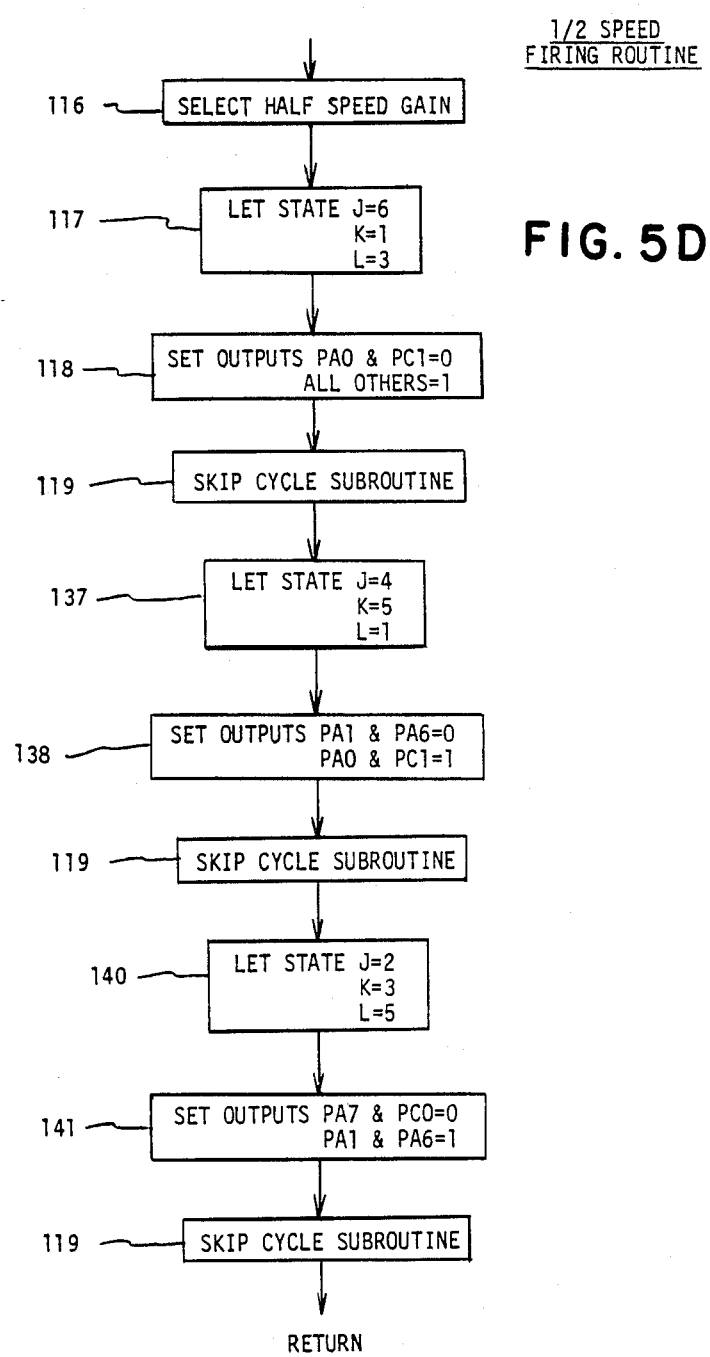

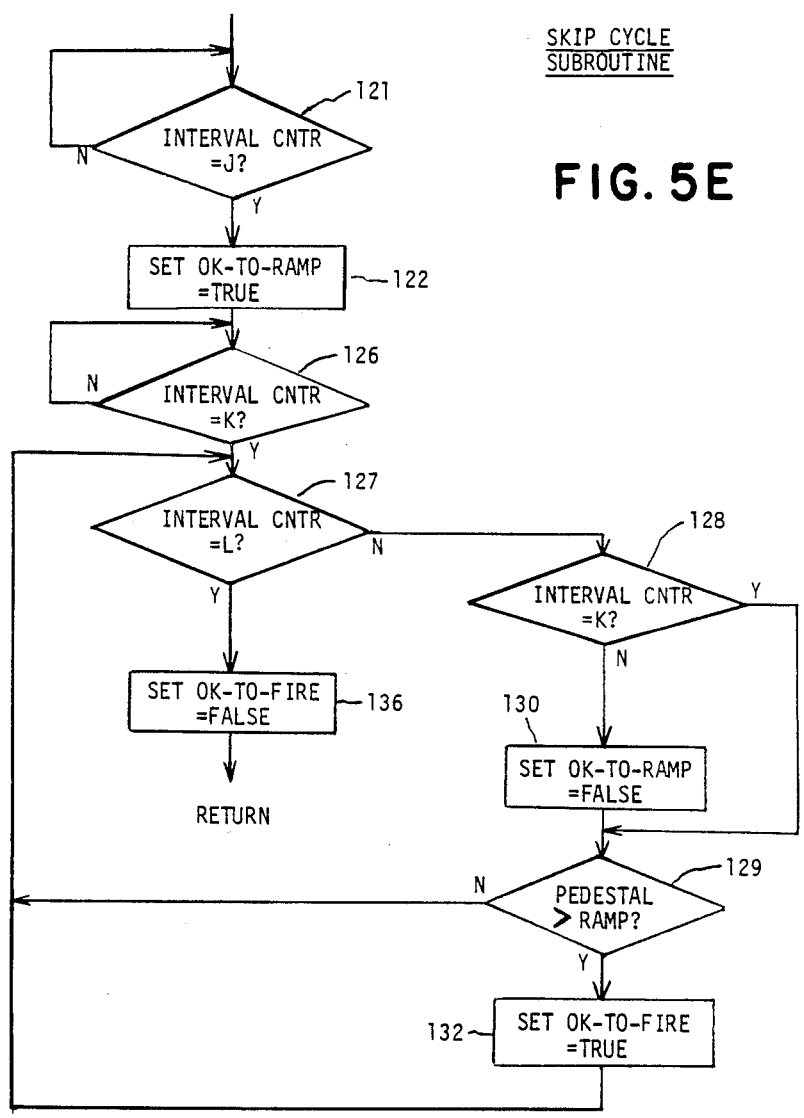

SPEED REDUCING CONTROL SYSTEM WITH VOLTAGE REGULATION FOR A POLYPHASE ELECTRIC MOTOR

CROSS REFERENCE TO RELATED APPLICATION

Certain features of the illustrated embodiment of this invention are the claimed subject matter of copending patent application Ser. No. 540,727 (now U.S. Pat. No. 4,461,985) filed concurrently herewith for T. D. Stitt and assigned to General Electric Company.

BACKGROUND OF THE INVENTION

This invention relates to drive systems for variable speed alternating current (a-c) electric motors, and more particularly it relates to a "cycle-skipping" kind of motor speed control system.

Cycle-skipping speed control systems for single-phase a-c electric motors are well known in the art. See, for example, the paper "Low-Cost Electronic Speed Controller for Small Induction Motors" by W. Matley, K. B. Clarke, and P. Marshall presented at the Second International Conference on Electrical Variable-Speed Drives in London, England on Sept. 25–27, 1979 (IEE Conf. Publ. No. 179, pages 42–45). In a typical system of this kind a controllable bidirectional solid state switch (e.g., a pair of silicon controlled rectifiers or thyristors which are interconnected in inverse-parallel relationship with one another) is connected between the motor and a single-phase source of alternating voltage of constant frequency, and the switch is suitably controlled (when reduced speed is desired) so that selected half cycles of the source voltage are omitted from the voltage applied to the motor. Consequently the fundamental frequency of the output voltage is a predetermined fraction of the fundamental frequency of the source voltage, and the running speed of the motor will be correspondingly reduced compared to full speed. According to Matley et al, the source frequency can be reduced in steps of odd integers. U.S. Pat. No. 4,176,306 discloses a 3-phase application of such a system, wherein the maximum output frequency at low speed is one-fifth of the source frequency.

According to prior art U.S. Pat. No. 3,908,158, substantially constant motor torque can be maintained during reduced speed operation of a single-phase cycle-skipping system by retarding the "firing angle" of the bidirectional switch, whereby less than all of each non-skipped half cycle of source voltage is applied to the motor at the reduced gating frequency. This desirably reduces the amplitude of the fundamental component of the reduced-frequency output voltage. To control the frequency at which the switch is gated, U.S. Pat. No. 3,908,158 discloses a countdown circuit which requires that the source voltage have a constant frequency for proper operation.

Another prior art speed control system for driving an a-c motor at reduced speed is known as a "cycloconverter". In a typical polyphase cycloconverter, three controllable bidirectional switches are respectively connected between each terminal of the motor armature and the alternative phases of a 3-phase source of alternating voltage, and the switches are suitably controlled so that the fundamental frequency of the output voltage is desirably reduced compared to the frequency of the source voltage. A cycloconverter can be used with either a constant frequency source or a variable frequency source. However, its control circuits are somewhat complex, and it usually requires a relatively large frequency reduction for proper operation.

SUMMARY OF THE INVENTION

A general objective of the present invention is to provide an improved cycle-skipping polyphase motor speed control system.

Another object is to provide a cycle-skipping polyphase motor speed control system characterized by having a relatively simple voltage regulator and by being compatible with a source of variable frequency alternating voltage.

In carrying out the invention in one form, the three phases of a 3-phase source of generally sinusoidal alternating voltage of variable fundamental frequency (f) and rms magnitude (v) are respectively connected to corresponding phases of a 3-phase a-c motor by means of controllable bidirectional switches, and two of the source and motor phases are cross-connected via two additional switches of the same kind. Each switch has a non-conducting state, a positive conducting state in which motor current flows through the switch in one direction, and a negative conducting state in which motor current flows through the switch in the opposite direction. The conducting states of the switches are selectively initiated by periodic firing signals which are cyclically produced by associated control means. The control means is supplied with a speed command signal which indicates whether full motor speed or a fraction "1"/N of full motor speed is desired (e.g., N is 2 for half speed or 4 for quarter speed), and it is also supplied with a train of timing pulses synchronized with zero-crossings of the phase-to-phase source voltage.

The control means is arranged to produce, when full speed is desired, a family of six firing signals that are synchronized with the aforesaid timing pulses and that respectively commence in a predetermined sequence at approximately 1/6f intervals. The control means is further arranged, when a predetermined fraction of full speed is desired: (1) to predetermine for each desired speed a particular family and pattern of three different pairs of firing signals, (2) to establish a series of recurrent periods synchronized with the timing pulses, each period having a duration of approximately N/f, (3) to preselect for each desired speed three separate "windows" in each of said periods during which firing signals can be produced, with only one pair of firing signals being permitted during any one of the preselected windows, and (4) to produce in turn, during succeeding preselected windows in each period, the predetermined pairs of firing signals with each pair actually commencing at a time determined by a control signal. In accordance with the present invention, the aforesaid control signal is derived from reference and feedback signals, with the feedback signal being representative of the motor voltage, the reference signal being representative of the source voltage, and the control signal being representative of any deviation of the rms magnitude of motor voltage from v/N.

The invention will be better understood and its various objects and advantages will be more fully appreciated from the following description taken in conjunction with the accompanying drawings.

BRIEF DESCRIPTION OF THE DRAWINGS

FIGS. 5A, 5B, 5C, 5D, 5E and 5F are flow charts that explain the operation of the preferred embodiment of the FIG. 2 control means to produce the firing signal families shown in FIG. 3.

DESCRIPTION OF THE PREFERRED EMBODIMENT

Figure 1:
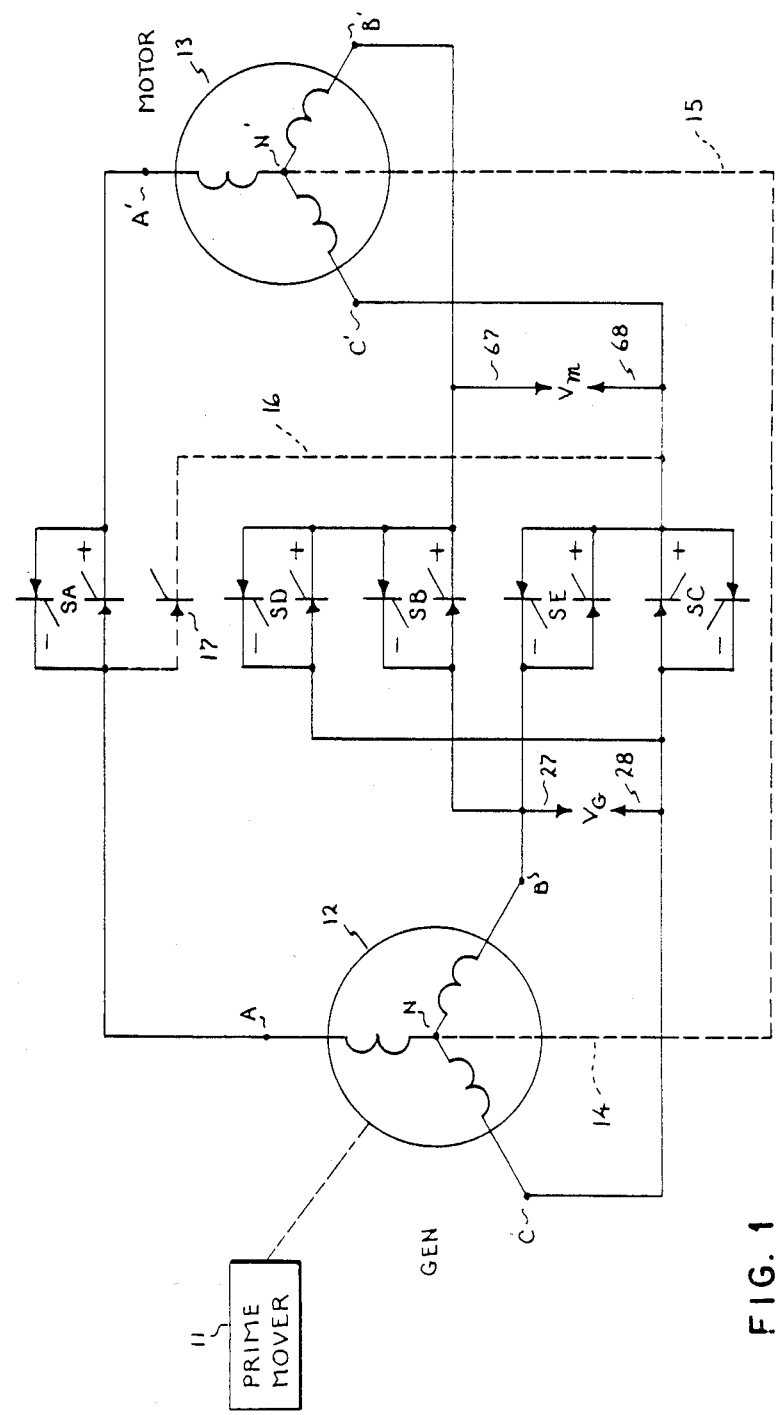
FIG. 1 is a schematic diagram of an electric power circuit comprising a variable speed, 3-phase a-c motor, a 3-phase a-c generator driven by a variable speed prime mover, and a plurality of controllable bidirectional switches connected between the motor and generator.

The power circuit shown in FIG. 1 comprises a prime mover 11 mechanically coupled to the rotor of a 3-phase a-c generator 12 (sometimes referred to as an "alternator") which serves as a source of alternating voltage to be applied to a variable speed 3-phase a-c motor 13. The fundamental frequency of the voltage at the output of the generator 12 (i.e., the frequency of the fundamental sinusoidal component of the generator's output voltage waveform) is "f" Hertz, and the rms magnitude of this voltage is "v" volts. The magnitude of f depends on the angular velocity (rpm) at which the generator rotor is driven by the prime mover 11.

In the presently contemplated application of the invention, the motor 13 is used to drive the impeller or blades of a centrifugal blower or fan in the air cooling system of a self-propelled traction vehicle such as a diesel-electric locomotive, and in such an environment the prime mover 11 is a variable speed diesel engine. Consequently, both the frequency and the magnitude of the alternating voltage output of the generator 12 are variables. By way of example, in normal operation f can vary in a 3-to-1 range between 35 and 105 Hz, and v will correspondingly vary, with f, in a range between 134 and 402 volts rms. Preferably the generated voltage has a generally sinusoidal waveform.

As is in indicated in FIG. 1, the first, second, and third phases of the 3-phase windings of generator 12 are so arranged as to respectively energize three power input terminals A, B, and C of the cycle-skipping speed control system of the present invention. A normal phase rotation of A-B-C is herein assumed. The output terminals of the system are designated A', B' and C', and they in turn are respectively adapted to be connected to the corresponding phases of the armature windings of the motor 13. By way of example, the motor 13 is a conventional induction type of rotating machine having 3-phase star-connected windings, and it has a rating of 60 horsepower at full speed when the fundamental frequency of the applied voltage is 105 Hz. A 3-wire power circuit is presently preferred; alternatively, if the invention were used in conjunction with a 3-phase, 4-wire circuit, the source of alternating voltage would include a neutral wire 14, and a conductor (see the broken line 15 in FIG. 1) would be provided to interconnect the neutral wire 14 and the neutral N' of the motor windings.

The input and output terminals of the speed control system are interconnected by means of a plurality of controllable bidirectional switches. In the illustrated embodiment of the invention, there are five such switches: a first switch SA is connected between the first input and output terminals A and A'; a second switch SB is connected between the second input and output terminals B and B', a third switch is connected between the third input and output terminals C and C', a fourth switch SD is connected between the third input terminal C and the second output terminal B', and a fifth switch SE is connected between the second input terminal B and the third output terminal C'. It will now be apparent that the first three switches connect the three source phases to the corresponding motor phases, whereas the fourth and fifth switches are arranged to cross-connect the second and third phases of the source and of the motor, respectively. If desired, the fourth and fifth switches could be replaced by an equivalent reversing contactor.

Each of the controllable bidirectional switches has a non-conducting state, a positive conducting state in which motor current flows through the switch in one direction (e.g., current flows from the source to the motor), and a negative conducting state in which motor current flows through the switch in the opposite direction (e.g., from the motor to the source). In the preferred embodiment, each switch comprises at least one inverse-parallel pair of controllable unidirectional electric valves which preferably are solid state controlled rectifiers popularly known as thyristors. Each of the illustrated thyristors has a turned on (conducting) state and a turned off (non-conducting) state. As can be seen in FIG. 1, in each switch a plus symbol "+" is associated with the gate or control electrode of the thyristor that is poled to conduct positive motor current, and a minus symbol "−" is associated with the gate or control electrode of the thyristor that is poled to conduct negative motor current. As will soon be explained, if and when it is desired to operate the motor 13 at one-third of full motor speed, the first input terminal A and the third output terminal C' of the speed control system can be interconnected via an optional conductor 16 (shown as a broken line in FIG. 1) and at least one additional thyristor 17 which is poled to conduct positive motor current.

In order to turn on an individual thyristor in any one of the five inverse-parallel pairs that form the illustrated bidirectional switches, an appropriate signal is applied to the associated gate while the main electrodes of that thyristor are forward biased (i.e., anode potential is positive with respect to cathode). Such a signal is sometimes called a trigger or gating signal, and it is herein referred to generically as a "firing signal." Subsequently, due to the periodic reversal of the source voltage polarity, the main electrodes will become reverse biased whereupon the thyristor automatically turns off (i.e., it reverts to its high-resistance, non-conducting, open circuit state) by an "a-c line commutation" process.

Figure 2:
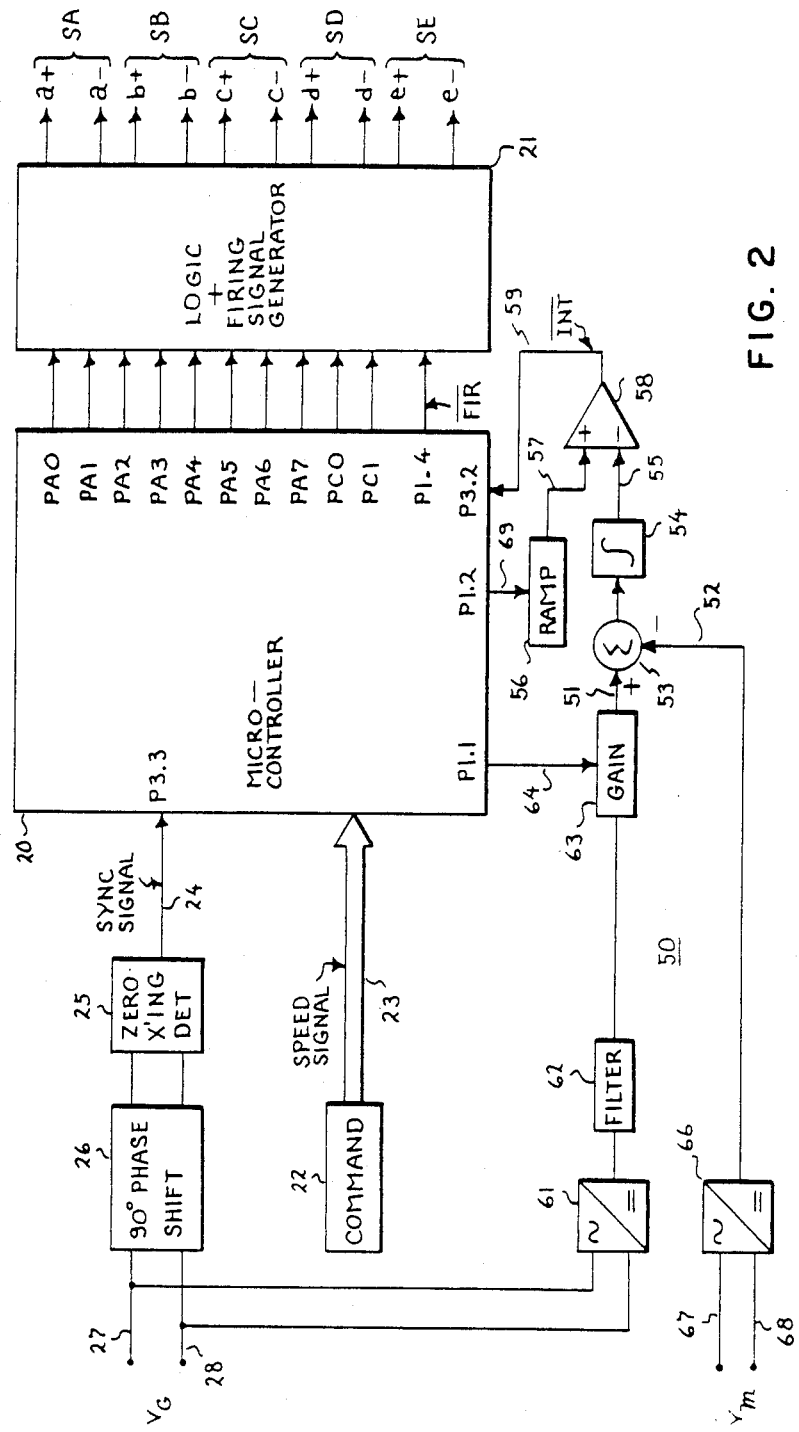
FIG. 2 is a simplified block diagram of control means according to the present invention for producing firing signals which are required to initiate the conducting states of the respective switches shown in FIG. 1.

The firing signals for the controllable switches are supplied by the control means shown in FIG. 2. In a manner that will soon be explained, the control means is effective cyclically to produce, in synchronism with the source voltage, alternative families of six periodic firing signals each. The particular combination and pattern of the firing signals in a family is determined by two factors: whether full motor speed or a fraction "1"/N of full speed is desired (N being a predetermined integer such as 2, 3, or 4), and whether a forward or reverse motor direction is commanded.

Figure 3:
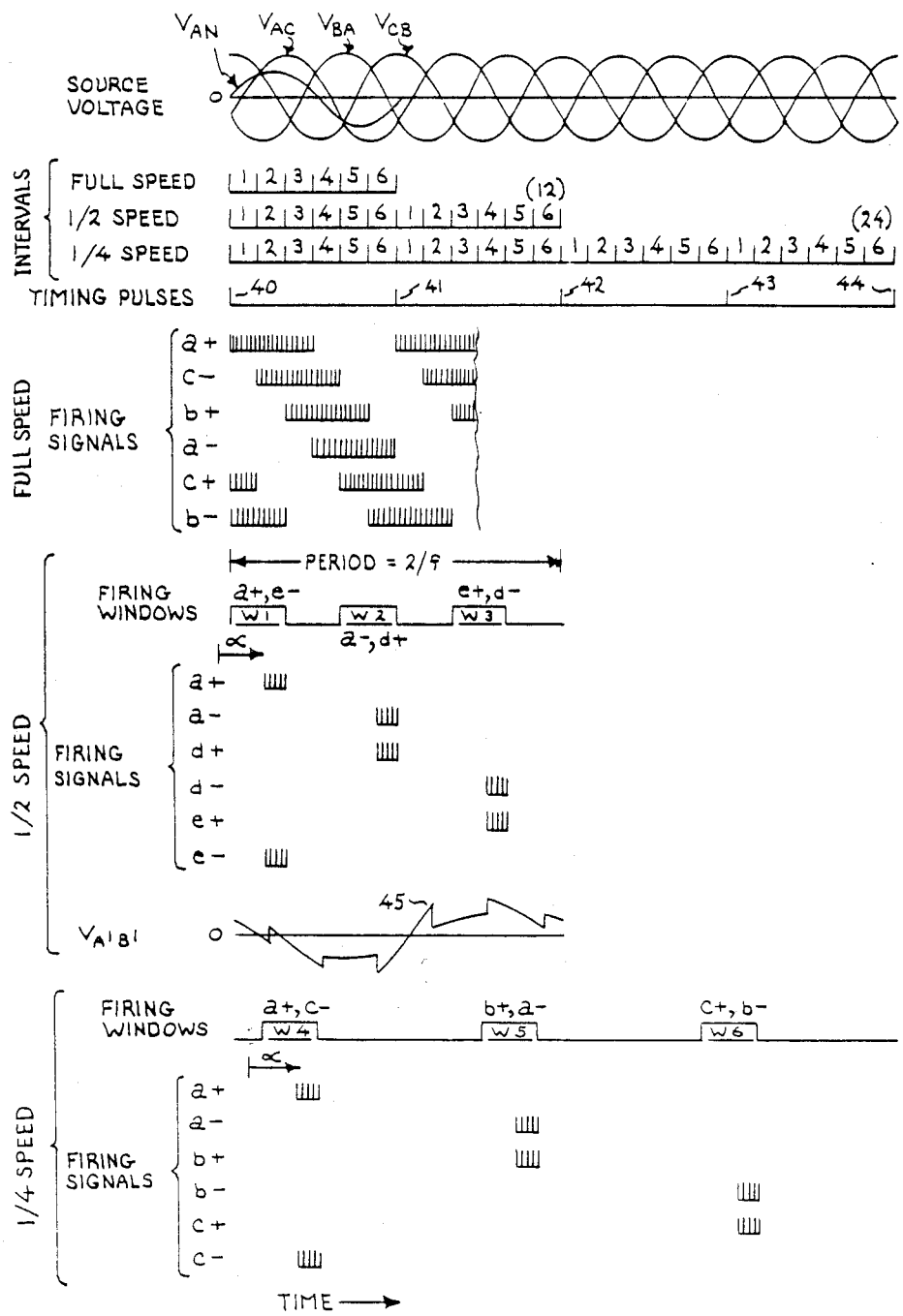
FIG. 3 is a time chart showing three families of firing signals that the FIG. 2 control means will produce at full speed, half speed, and quarter speed, respectively, during at least one full cycle of the fundamental component of motor voltage.

When the motor 13 is to run at full forward speed, the family of firing signals that is cyclically produced by the control means comprises firing signals for the six thyristors in the three pairs of thyristors that form the first, second, and third switches SA, SB, and SC. In FIGS. 2 and 3 these signals are identified by the reference characters a+ and a− for switch SA, b+ and b− for switch SB, and c+ and c− for switch SC. The control means is suitably arranged so that these six firing signals respectively begin at equal, staggered intervals of approximately 1/6f second, with the signals commencing in the following sequence: b−, a+, c−, b+, a−, c+. This will initiate, in the named sequence, the negative conducting state of the second switch SB, the positive conducting state of the first switch SA, the negative conducting state of the third switch SC, the positive conducting state of SB, the negative conducting state of SA, and the positive conducting state of SC. Note that when operating in this full speed mode, the speed control system does not skip any half cycles of the 3-phase source voltage, the alternating voltage at the output terminals A', B' and C' has the same fundamental frequency (f) as the source voltage, and the motor speed varies with f. If a reverse direction were commanded, the control means would substitute firing signals for the thyristor pair in the fourth switch SD (d+ and d− in FIGS. 2 and 3) for c+ and c−, respectively, and it would substitute firing signals (e+ and e−) for the thyristor pair in the fifth switch SE for b+ and b−, respectively.

When the motor 13 is to run at one-half forward speed, the control means will produce during a cycle of 2/f duration a family of six firing signals for the three thyristor pairs that form the first, fourth and fifth switches SA, SD, and SE, respectively. The control means is suitably arranged to produce the signals in three different sets of two concurrent signals each, with the beginnings of successive sets or pairs of signals being spaced from one another by approximately 2/3f second. More specifically, the firing signal pairs commence in the following sequence: pair a+ and e−, pair a− and d+, pair d− and e+. This will initiate, in the named sequence, both the positive conducting state of the first switch SA and the negative conducting state of the fifth switch SE, both the positive conducting state of the fourth switch SD and the negative conducting state of SA, and both the positive conducting state of SE and the negative conducting state of SD. Note that when operating in this half-speed mode, the speed control system skips three out of four half cycles in each of the three phase-to-phase voltage waveforms of the source, the alternating voltage at the output terminals A', B' and C' has a fundamental frequency of f/2 and motor speed still varies with f but is one-half what it would be if no half cycles were skipped.

If the motor 13 were to run at one-half forward speed in a 3-phase, 4-wire system, the control means would be arranged to produce during a cycle of 2/f duration a family of three pairs of firing signals for the thyristor pairs that form the first, fourth and fifth switches SA, SD and SE, respectively. In this case the firing signals would commence in the following sequence: a−, a+, d−, d+, e−, e+. This will initiate, in the named sequence, the negative and positive conducting states of the first switch SA, the negative and positive conducting states of the fourth switch SD, and the negative and positive conducting states of the fifth switch SE.

When the motor 13 is to run at one-quarter forward speed, the control means will produce during a cycle of 4/f duration a family of six firing signals for the three thyristor pairs that form the first, second and third switches SA, SB, and SC, respectively. The control means is suitably arranged to produce these signals in three different sets of two concurrent signals each, with the beginnings of successive sets or pairs of signals being spaced from one another by approximately 4/3f second. More specifically, the firing signal pairs commence in the following sequence: pair a+ and c−, pair a+ and b+, pair b− and c+. This will initiate, in the named sequence, both the positive conducting state of the first switch SA and the negative conducting state of the third switch SC, both the positive conducting state of the second switch SB and the negative conducting state of SA, and both the positive conducting state of SC and the negative conducting state of SB. Note that when operating in this quarter speed mode, the speed control system skips seven out of eight half cycles in each of the three phase-to-phase voltage waveforms of the source, the alternating voltage at the output terminals A', B' and C' has a fundamental frequency of f/4 and the motor speed still varies with f but is one-quarter what it would be if no half cycles were skipped.

If the motor 13 were to run at one-third forward speed, the control means would be arranged to produce during a cycle of 3/f duration a family of six firing signals for the two thyristor pairs that form the first and second switches SA and SB, the thyristor that is turned on during the negative conducting state of the fifth switch SE, and the additional thyristor 17. These six signals would be produced in three different sets of two concurrent signals each, with the beginnings of successive sets or pairs of signals being spaced from one another by approximately 1/f second. More specifically, the firing signal pairs commence in the following sequence: pair a+ and e−, pair a− and b+, pair b− and a firing signal for the thyristor 17. This will turn on, in the named sequence, both the positive thyristor in the first switch SA and the negative thyristor in the fifth switch SE, both the positive thyristor in the second switch SB and the negative thyristor in SA, and both the thyristor 17 and the negative thyristor in SB. Note that when operating in this one-third speed mode, the speed control system skips one positive half cycle and two negative half cycles out of every three full cycles in the phase-to-phase voltage waveform that the generator 12 applies across the input terminals A and B while skipping all of the half cycles of the other two phase-to-phase generator voltage waveforms, the alternating voltage at the output terminals A', B' and C' has a fundamental frequency of f/3 and the motor speed still varies with f but is one-third what it would be no half cycles were skipped. In effect, one phase-to-phase generator voltage is sequentially supplied, at one-third frequency, to the three different pairs of output terminals (A'-B', B'-C', C'-A'), respectively. This will not over-load the generator windings that are connected between input terminals A and B because at one-third speed the motor load is only a small fraction of the full speed load (horsepower being a function of the cube of speed).

It will now be apparent that for each fractional speed of the motor 13 there is a particular combination and pattern of three different pairs of firing signals that characterize the family of six periodic firing signals produced by the control means. In the presently preferred embodiment of the invention, the firing signal combinations and patterns are determined by a microcontroller which is represented by a single block 20 in FIG. 2. Persons skilled in the art of microcomputers will understand that the microcontroller 20 is actually a coordinated system of commercially available microcomputer components and associated electrical circuits and elements that can be programmed to perform a variety of desired functions. By way of example, the system includes an Intel 8031 microprocessor, an Intel 2764 EPROM, an Intel 8255 programable peripheral interface, and several other related peripheral components.

As is indicated in FIG. 2, the microcontroller 20 receives three input signals, referred to as a synchronizing (SYNC) signal, a speed command signal, and an interrupt (INT) signal, respectively, and it is operative to produce output signals at certain ports PA0 through PA7, PC0 and PC1, P1.1, P1.2, and P1.4. Each output is in the form of a bistable digital signal that is either low ("0") or high ("1") with respect to a predetermined electrical reference level. The ports PA0 through PA7, PC0, PC1, and P1.4 are in turn connected to a circuit 21 which includes suitable logic means and signal processing means for selectively generating the aforesaid firing signals. More particularly, the firing signal a+ for the positive thyristor in the first switch SA is produced only if and when there are concurrent "0" output signals at ports PA0 and P1.4 of the microcontroller 20, the firing signal a— for the negative thyristor in the same switch is produced only if and when there are concurrent "0" output signals at port PA1 and P1.4, the firing signal b+ for the positive thyristor in the second switch SB is produced only if and when there are concurrent "0" output signals at ports PA2 and P1.4, the firing signal b— for the other thyristor in switch SB is produced only if and when there are concurrent "0" output signals at ports PA3 and P1.4, the firing signal c+ for the positive thyristor in the third switch SC is produced only if and when there are concurrent "03[ output signals at ports PA4 and P1.4, the firing signal c— for the other thyristor in switch SC is produced only if and when there are concurrent "0" output signals at ports PA5 and P1.4, the firing signal d+ for the positive thyristor in the fourth switch SD is produced only if and when there are concurrent "0" output signals at ports PA6 and P1.4, the firing signal d— for the other thyristor in switch SD is produced only if and when there are concurrent "0" output signals at ports PA7 and P1.4, the firing signal e+ for the positive thyristor in the fifth switch SE is produced only if and when there are concurrent "0" output signals at ports PC0 and P1.4, and the firing signal e— for the other thyristor in the latter switch is produced only if and when there are concurrent "0" output signals at ports PC1 and P1.4.

The speed command input signal for the microcontroller 20 is provided by an externally controlled command means 22 which is connected, via a multi-line bus 23, to the microcontroller. This signal is suitably encoded to indicate whether full forward speed, full reverse speed, half forward speed (N=2), quarter forward speed (N=4), or zero speed is desired.

The SYNC signal is supplied to an input port 3.3 of the microcontroller 20 over a line 24 from a zero-crossing detector 25 which is coupled to terminals B and C (FIG. 1) via a phase shift circuit 26 and two lines 27 and 28. The circuit 26 includes an integrator which advances the phase of its output voltage by approximately 90 electrical degrees with respect to the single-phase alternating voltage $V_G$ between terminals B and C, and due to this integrating process any irregularities or "notches" in the generally sinusoidal waveform of $V_G$ are eliminated from the alternating voltage waveform that is applied to the zero-crossing detector 25. The detector 25 changes state each time the instantaneous magnitude of its input voltage crosses zero, whereby the signal at its output alternates between high ("1") and low ("0") levels. Thus the SYNC signal is a "square wave" that corresponds both in frequency (f) and in phase with the fundamental component of $V_{AN}$ (i.e., the phase A-to-neutral N voltage of the 3-phase alternating voltage source). In other words, the single-phase square wave (SYNC) signal that is fed to the microcontroller on the input line 24 is synchronized with the source voltage.

The fundamental components of the respective phase-to-phase voltages $V_{AC}$, $V_{BA}$, and $V_{CB}$ of the 3-phase variable frequency a-c source are shown in FIG. 3 for four consecutive whole cycles of $V_{AN}$. As noted above, $V_{AN}$ and the SYNC signal are in phase with one another. The SYNC signal is used to trigger certain synchronizing and timing functions in the microcontroller 20. In the presently preferred embodiment of the microcontroller, its components are suitably interconnected and programmed to perform these functions in the manner that will now be briefly described with reference to FIGS. 3 and 4.

The microcontroller 20 includes means for converting the periodic 0-to-1 transitions of the SYNC signal on line 24 into a train of very short-duration timing pulses on a line 30. Such means is functionally equivalent to a conventional monostable multivibrator, and in FIG. 4 it is represented by a block 31 labeled "one shot." The input of the one shot 31 is supplied with the SYNC signal on line 24. The timing pulses that this component derives have a frequency of f, and their period is the reciprocal of f.

Figure 4:
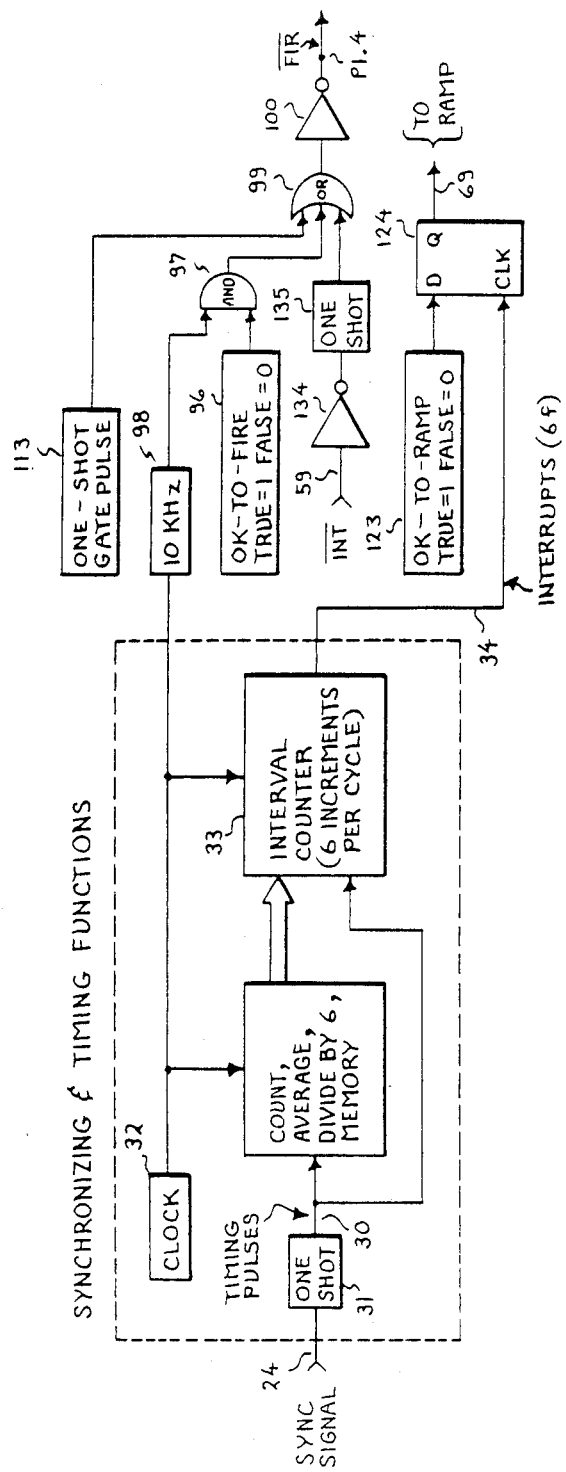
FIG. 4 is a functional block diagram of an "equivalent circuit" that is used to illustrate certain features of the FIG. 2 control means.

In FIG. 4 the block 32 labeled "clock" is a conventional oscillator that generates very high-frequency clock pulses at a very stable, constant frequency (e.g., 1 MHz). The number of constant-frequency clock pulses that are generated during the variable period between successive timing pulses is counted in order repetitively to measure the time therebetween. Each time there is a timing pulse on line 30, the number of clock pulses that have accumulated since the preceding timing pulse is counted. This count is averaged with a previously computed old average to compute a new average which is then stored in memory as the next old average. The new average is also divided by six to determine the number of clock pulses that will be generated during a base interval that is one-sixth of the average length of the period between successive timing pulses. As is indicated in FIG. 4, this information is bused to an interval counter 33 which produces, on an output line 34, a series of six interrupts per cycle of the SYNC signal.

The first interrupt in each series coincides with a timing pulse on line 30 and hence with a 0-to-1 transition of the SYNC signal on line 24. Thereafter, the interval counter is incremented each time the one-sixth count is reached so that the next five interrupts on line 34 are each spaced from the immediately preceding interrupt by the aforesaid base interval. In other words, between successive timing pulses the interval counter 33 automatically cycles through a set of six consecutive intervals or states of substantially equal length, the duration of each interval being approximately 1/6f. The six intervals have been shown and numbered in FIG. 3 where it will be observed that they are respectively concurrent with successive 60-degree segments of the source voltage waveform $V_{AN}$. The timing pulses for four consecutive cycles of $V_{AN}$ are also shown in FIG. 3. Pulses 40 and 41 mark the beginning and ending, respectively, of one whole cycle of $V_{AN}$ and hence of the SYNC signal on line 24. Pulses 42, 43, and 44 in turn mark the ends of the next three cycles.

The various components of the microcontroller 20 and of the logic and firing signal generator 21 that are shown in block form in FIG. 2 are suitably interconnected and programmed to respond to a full forward speed command by producing, during each cycle of the SYNC signal on line 24 and in synchronism therewith, a family of six firing signals a+, c−, b+, a−, c+, and b− which respectively commence, at intervals of approximately 1/6f, in the named sequence. This family is illustrated in FIG. 3 over a span of time corresponding to one and one-half periods of the synchronizing signal. Steady state full speed operation is herein assumed. It will be observed that the control means, in its presently preferred embodiment, produces the firing signal a+ concurrently with intervals 1, 2 and 3 of the interval counter 33 (FIG. 4) while it produces the complementary firing signal a− concurrently with intervals 4, 5 and 6. The firing signal b+ is produced concurrently with intervals 3, 4 and 5, while its complementary firing signal b− is produced concurrently with intervals 6, 1 and 2. The firing signal c+ is concurrent with intervals 5, 6 and 1, and the complementary signal c− is concurrent with intervals 2, 3 and 4. In this embodiment, therefore, each full-speed firing signal begins 30 electrical degrees in advance of the zero crossing of the relevant phase-to-phase source voltage, at which time the main electrodes of the associated thyristor are still reverse biased. Consequently, under steady state full speed conditions a thyristor cannot actually turn on when its firing signal commences. The turn on action will be delayed for 30 electrical degrees or longer (due to the inductive character of the motor load) until the main electrodes become forward biased.

The control means is further arranged to respond to either a half speed (N=2) or a quarter speed (N=4) command signal by performing the following functions:

(1) predetermine the desired combination and pattern of three different pairs of firing signals per family, one family if N=2 and another family if N=4;

(2) establish a series of recurrent periods synchronized with the square wave signal on line 24, each period having a duration of approximately N/f;

(3) preselect, for N=2 and also for N=4, three separate portions (windows) of each of the aforesaid periods during which the firing signals can be produced, with only one pair of firing signals being permitted during any one of these windows; and (4) produce in turn, only during succeeding preselected windows in each period, the aforesaid predetermined pairs of firing signals, with the commencement of each signal being delayed until the interrupt signal that is supplied to port P3.2 is cleared (i.e., until there is a 1-to-0 transition of INT).

FIG. 3 illustrates one of the recurrent periods of 2/f duration that are established when N=2 and one of the recurrent periods of 4/f duration that are established when N=4. At half speed each of the recurrent periods comprises two of the aforesaid sets of six 60-degree intervals (for a total of 12 consecutive intervals), whereas at quarter speed each of the recurrent periods comprises four of these sets (for a total of 24 consecutive intervals). In other words, each recurrent period comprises 6N consecutive intervals.

FIG. 3 also illustrates, for both half speed and quarter speed modes of operation, the three firing windows that the microcomputer is programmed to select in each of the established recurrent periods, and it illustrates the particular pairs of firing signals that are respectively produced during succeeding windows under steady state conditions. More particularly, in the half speed mode the first window W1 occurs when the phase A-to-phase B source voltage is positive (i.e., during a negative half cycle of $V_{BA}$ in FIG. 3), and the firing signals a+ and e− can be produced at this time. In the illustrated embodiment this window has less than a half-cycle duration; it actually coincides with intervals 1 and 2 of the first set of intervals, starting 30 electrical degrees after and ending 30 degrees before the zero crossings of $V_{BA}$. The second window W2 in the same period occurs when phase C of the source is next positive with respect to phase A (i.e., during the first negative half cycle of $V_{AC}$ in FIG. 3), and the firing signals that can then be produced are a− and d+. In practice the window W2 coincides with intervals 5 and 6 of the first set, starting 30 degrees after and ending 30 degrees before the zero crossings of $V_{AC}$. The third window W3 occurs when phase B is next positive with respect to phase C (i.e., during the ensuing negative half cycle of $V_{CB}$ in FIG. 3), and the pair of firing signals e+ and d− can then be produced. This window actually coincides with intervals 3 and 4 of the second set of six intervals, again starting 30 degrees after and ending 30 degrees before the zero-crossings of $V_{CB}$. The waveform of the resulting phase-to-phase alternating voltage $V_{A'B'}$ across the output terminals A' and B' for half speed operation of the 3-phase motor 13 (FIG. 1) is shown by the trace 45 in FIG. 3. The fundamental component of this output voltage has a period of 2/f and a frequency of one-half f.

In the quarter speed mode of operation, the first firing window W4 during the illustrated period of 4/f duration will occur when the phase A-to-phase C source voltage $V_{AC}$ is positive during the first cycle of the SYNC signal (i.e., between timing pulses 40 and 41), and the firing signals a+ and c− can be produced at this time. As illustrated, this window actually coincides with intervals 2 and 3 of the first set of six intervals, starting 30 electrical degrees after and ending 30 degrees before the zero crossings of $V_{AC}$. The second window W5 in the same period occurs when the phase B-to-phase A source voltage $V_{BA}$ is positive during the second cycle of the SYNC signal (i.e., between timing pulses 41 and 42), and the firing signals that can then be produced are b+ and a−. In practice the window W5 coincides with intervals 4 and 5 of the second set, starting 30 degrees after and ending 30 degrees before the zero crossings of $V_{BA}$. The third window W6 occurs when the phase C-to-phase B voltage is positive near the end of the third cycle and beginning of the fourth cycle (i.e., just before and after the timing pulse 43 in FIG. 3), and the pair of firing signals c+ and b− can then be produced. This window actually coincides with interval 6 of the third set and the succeeding interval 1 of the fourth set, again starting 30 degrees after and ending 30 degrees before the zero crossings of $V_{CB}$. The fundamental component of the resulting alternating voltage at the output terminals of the cycle-skipping speed control system during quarter speed operation has a period of 4/f and a frequency of one-quarter f.

The microcomputer 20 can be alternatively arranged and programmed to operate in a one-third speed (N=3) mode. In this case, the first firing window during a period of 3/f duration would occur when the phase A-to-phase B source voltage is positive during the first cycle of the SYNC signal (i.e., between timing pulses 40 and 41), and the firing signals a+ and e− would be produced at this time. The second window in the same period would occur when the same voltage is negative during either the same cycle or the next cycle of the SYNC signal, and firing signals b+ and a− would then be produced. The third window would occur when the phase A-to-phase B voltage is again positive during the third cycle of the SYNC signal (i.e., between timing pulses 42 and 43), and at this time a firing signal for the thyristor 17 along with the firing signal b− would be produced.

It will be observed in FIG. 3 that at half and quarter speeds the predetermined pairs of firing signals do not commence until sometime after the respective firing windows begin. The point of time at which each pair actually commences is regulated so that the fundamental component of motor voltage will have substantially the same amplitude-to-frequency ratio at fractional speeds as at full speed. In accordance with the present invention, this result is achieved by providing a regulator 50 (see FIG. 2) that cooperates with the microcontroller 20 to advance or to retard the start of each pair of firing signals, within the limits of the corresponding firing window, as necessary to minimize any deviation of the rms magnitude of the output voltage from the product of v times a predetermined proportionality constant which is less than 1. As already mentioned, v is the rms magnitude of the source voltage and varies with f. Ideally, as is herein described, the proportionality constant is the fraction 1/N, but in practice it can differ (within reasonable limits) from ideal. Accordingly, this regulating action will ideally maintain constant volts-per-Hertz at the output of the cycle-skipping speed control system when the voltage applied to the connected motor has reduced frequency. The resulting delay in starting each firing signal (at half or quarter speed) is shown in FIG. 3 by a line "α" representing a firing angle (in electrical degrees) which is referenced to the immediately preceding zero crossing of the relevant phase-to-phase source voltage. The preferred embodiment of the regulator 50 is shown in FIG. 2 and will now be described.

The regulator 50 includes reference means for providing on a line 51 a reference signal representative of the alternating voltage $V_G$ across the input terminals B and C, feedback means for providing on a line 52 a feedback signal representative of the alternating voltage $V_M$ across output terminals B' and C', means comprising a summing junction 53 and an integrator 54 for deriving on a line 55 a control signal representative of any magnitude error between the reference and feedback signals on lines 51 and 52, respectively, bistable ramp generating means 56 for producing on a line 57, when the means 56 is in an active state, a prescribed signal of changing value (herein sometimes referred to as a "ramp" signal), and a comparator 58 which compares the control signal on line 55 with the ramp signal on line 57 and which produces on a line 59 a normally high ("1") output signal that becomes low ("0") whenever the value of the control signal exceeds that of the ramp signal. The output signal on line 59 is the previously mentioned interrupt signal (INT) that is supplied to the input port P3.2 of the microcontroller 20. As will be explained more fully hereinafter, the microcontroller responds to each 1-to-0 transition of the INT signal by initiating a 0 signal at its output port P1.4.

The aforesaid reference means comprises a full-wave rectifier 61 having an a-c input and a d-c output, an electric filter 62, and an amplifier 63 labeled "gain." As can be seen in FIG. 2, the input of the rectifier 61 is connected to the lines 27 and 28 for energization by $V_G$, and the filter 62 is connected to the rectifier output. Consequently the magnitude of the output signal from the filter 62 is a measure of the average magnitude of the rectified voltage $V_G$. In practice, the rectifying function and the filtering or averaging function can be advantageously combined in a common circuit that will effectively perform both functions simultaneously. Since the source voltage has a generally sinusoidal waveform, the filter output signal will be substantially proportional to v.

The gain of the amplifier 63 is controlled so that the reference signal magnitude on line 51 varies with the product of the average magnitude of the rectified source voltage $V_G$ times the aforesaid proportionality constant which is approximately 1/N. In other words, the reference signal is representative of v/N. This is simply achieved by selecting a normal amount of gain to provide proper regulator response when the system is operating in a half speed mode, and by switching the gain to one-half of its normal amount when operating in a quarter speed mode. To initiate such switching, the amplifier 63 is connected via a line to the output port P1.1 of the microcontroller 20 which issues at this port a signal indicating whether or not the speed command signal on the input bus 23 is calling for one-fourth of full motor speed. Alternatively, the controlled gain can be introduced in the path of the feedback signal rather than in the path of the reference signal if desired.

The aforesaid feedback means comprises a full-wave rectifier 66 having an a-c input and a d-c output. Two lines 67 and 68 connect this rectifier input to the output terminals B' and C' (FIG. 1). The line 52 is connected directly to the rectifier output, whereby the unfiltered rectified voltage at the output of the rectifier 66 is applied to the summing junction 53. It will now be apparent that the unipolarity feedback signal on line 52 has an undulating magnitude that tracks the single-phase alternating voltage $V_M$ between output terminals B' and C', and that the resulting error signal at the output of the junction 53 has a ripple frequency of twice the fundamental frequency of $V_M$. The latter signal is fed to the integrator 54 which has a relatively low cross-over frequency (e.g., approximately 0.16 Hz). Since its cross-over frequency is appreciably lower than 0.5 f at the lowest frequency of the alternating voltage source, the integrator 54 in effect filters the error signal. The integrator output signal (i.e., the aforesaid control signal on line 55) therefore has a relatively smooth value that varies with respect to a predetermined base value (e.g., 0 volts) as a function of the time integral of any error between the magnitude of the reference signal on line 51 and the average magnitude of the unfiltered rectified voltage on line 52. So long as there is no such error, the magnitude of the control signal remains constant and can be thought of as a pedestal. If the error were negative (due to the average magnitude of the feedback signal exceeding the magnitude of the reference signal), the control signal magnitude would decrease (i.e., the pedestal would shift toward the aforesaid base value). On the other hand, if the error were positive (due to the average magnitude of the feedback signal being less than the magnitude of the reference signal), the control signal magnitude would increase up to a predetermined maximum (saturation) value.

The control signal from the integrator 54 is supplied over the line 55 to one input of the comparator 58. The other input of the comparator receives the ramp signal over line 57 from the output of the ramp signal generating means 56. The latter means is in either a quiescent state or an active state. In its quiescent state the output signal of the means 56 has a predetermined constant value (e.g., H volts) with respect to the aforesaid base value. This constant value is selected to be approximately the same as the maximum value of the control signal on line 55. On the other hand, whenever the means 56 is active, the value of its output signal is changing at a predetermined rate (e.g., it declines or ramps down, from its quiescent value toward the base value, at a reasonably constant rate of change). The rate of change of the ramp signal is selected so that the excursion of this signal during the longest active state of 56 will be less than H.

The ramp signal generating means 56 is so constructed and arranged that it is in its active state only if and when a "1" signal is received on an input line 69 from the output port P1.2 of the microcontroller 20. The microcontroller includes means responsive to the train of timing pulses that are derived from the SNYC signal on line 24 for producing the activating signal on line 69 contemporaneously with each of the three preselected firing windows in each of the recurrent periods of N/f duration. This causes the means 56 to switch from inactive to active states at the beginning of each window, and the INT signal at the output of the comparator 58 subsequently changes from 1 to 0 at whatever time the magnitude of the declining ramp signal on line 57 crosses the magnitude of the control signal on line 55 (i.e., when the ramp signal and the control signal have equal values). Thus the magnitude of the control signal determines the time at which the 1-to-0 transition of INT occurs: the higher the control signal, the earlier the transition occurs during each window. Thereafter, INT will remain 0 until the end of the window at which point the activating signal on line 69 is cleared, the ramp signal generating means 56 reverts to its quiescent state, the ramp signal on line 57 abruptly rises to its predetermined constant value which is higher than the magnitude of the control signal, and INT consequently changes from 0 to 1.

Figure 5C:
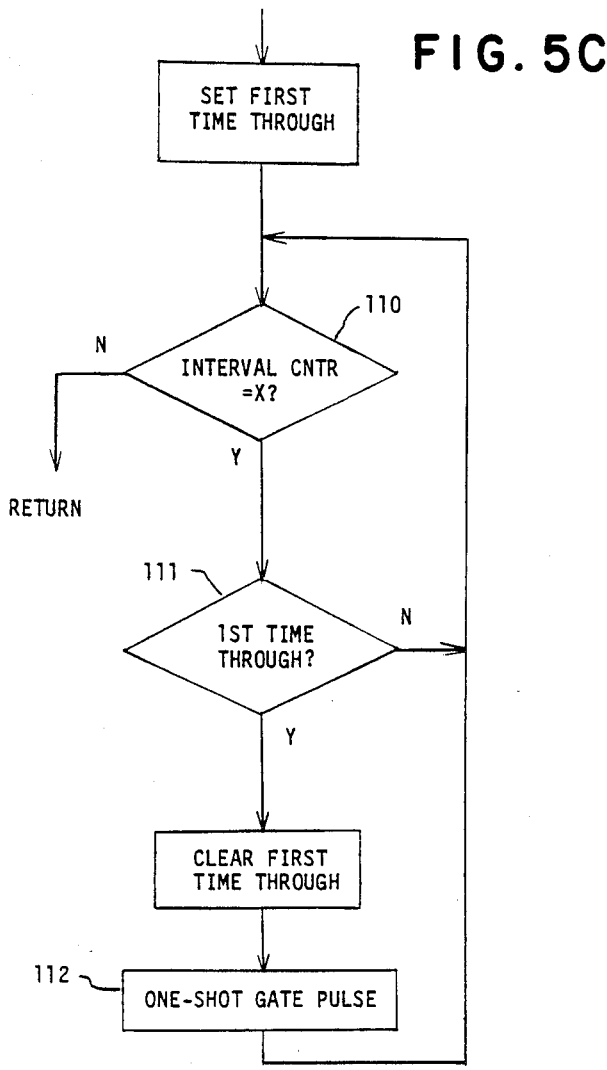

FIGS. 5A through 5F display flow charts of the presently preferred programs that are executed by the microcontroller 20 in order to produce the results already described with reference to FIG. 3. These programs (sometimes referred to as software) control directly the functioning of the microcontroller in the cycle-skipping speed control system of the present invention, and they control indirectly the associated logic means and firing signal generator 21. The Main Routine is shown in FIG. 5A. It begins at the entry point labeled "start." When commanded to start, the first step 71 of the Main Routine initializes the microcontroller 20, thereby resetting the counters and setting the stack pointers, registers, latches, outputs, and variable values of the microcontroller to their respective quiescent states or normal levels at the start of the first pass through the Main Routine. The second step 72 sets an "OK-to-ramp" flag in a first state that is herein referred to as "false," and this is automatically followed by the step 73 of reading the "new" speed command. The new speed command is the encoded speed command signal that is then being supplied to the microcontroller on the input bus 23. The next step 74 determines whether or not the new speed command is the same as a previously stored "old" speed command. If the new speed is not the same as the old speed (N stands for no in the flow charts), steps 75 and 76 are executed: step 75 sets an "OK-to-fire" flag in a first state referred to herein as "false," and step 76 stores the new speed in memory as an "old" speed command. Thereafter step 77 is initiated. Alternatively, if the new speed equals the old speed (Y stands for yes in the flow charts), steps 75 and 76 are skipped and step 77 is initiated immediately after step 74. In either case, step 77 determines whether or not the new speed command that was read in step 73 is calling for full speed in a forward direction. If affirmative, a "forward direction" flag is set in its "true" state and the control is transferred to a Full Speed Routine 78. The presently preferred embodiment of the Full Speed Routine will soon be described with reference to FIGS. 5B and 5C.

As is indicated in FIG. 5A, if the new speed command is not full speed forward, a test is made in the next step 79 of the Main Routine to see if full speed reverse is being called for. If so, the forward direction flag is set in its false state and the control is transferred to the above-mentioned Full Speed Routine 78. On the other hand, if the new speed command is not full speed reverse, another test is made in step 80 to see if it is calling for half speed. If the answer is yes, the control is transferred to a One-Half Speed Routine 81 (see FIGS. 5D and 5E); if the answer is no, the next step 82 of the Main Routine makes one more test to see if quarter speed is being called for. If it is determined in step 82 that quarter speed is being commanded, the control is transferred to a One-Fourth Speed Routine 83 (see FIGS. 5E and 5F); otherwise, as is indicated in FIG. 5A, the final step 84 of the Main Routine sets the OK-to-fire flag in its false state and the Main Routine is automatically recycled by again executing the above-described step 72.

A flow chart of the Full Speed Routine 78 (under steady state conditions) is shown in FIG. 5B which will now be described. The first step 91 of this routine inquires as to the state of the aforesaid interval counter 33 which is part of the synchronizing and timing functions of the microcontroller 20 (see FIGS. 3 and 4), and more specifically it looks for interval No. 1. As soon as the counter 33 advances from interval 6 to interval 1, the second step 92 of the Full Speed Routine is executed. In the second step the signal at the output port PA0 of the microcontroller is set at a low level, and the signals at all of the companion output ports PA1 through PA7, PC0, and PC1 are high. In the next step 93 a test is made to see if the forward direction flag is in a true or false state. If true, the signals at output port PA3 and PA4 are set at low levels; if false, the signals at outport ports PA6 and PC1 are set at low levels. Now a step 94 is executed to set the "OK-to-fire" flag in a second state referred to as "true," and the control enters the first of six Interval Test Subroutines.

Whenever the OK-to-fire flag is in its true state a train of high-frequency low ("0") signals is produced at the output port P1.4 of the microcontroller 20. Such a train is hereinafter referred to as a firing enable (FIR) signal. The presently preferred manner of producing the FIR signal is illustrated in FIG. 4 and will now be briefly described. In FIG. 4 the OK-to-fire flag is represented as a block 96 which has a high output so long as the flag is set in its true state and a low output when the state of the flag is false. The output of block 96 is fed to one of two inputs of an AND logic component 97. The other input of component 97 is continuously supplied with recurrent "1" pulses from a constant-frequency generator 98 which in turn is responsive to the aforesaid oscillator 32. Preferably each of these pulses has a relatively short, constant width of approximately ten microseconds, and the pulses recur at a high frequency of approximately 10 KHz. Whenever, and only when, high signals are concurrently received at both of its input, the AND component 97 passes a high output signal through an OR logic circuit 99 to a polarity inverter 100. The output of the inverter 100 is connected to the output port P1.4 of the microcontroller. Consequently, while the OK-to-fire flag is in its true state the inverter 100 provides at P1.4 a train of low signals (FIR) which coincide with the recurrent "1" pulses from the generator 98.

Returning to FIG. 5B, the first Interval Test Subroutine of the Full Speed Routine is represented by a single block 101. This subroutine comprises a series of steps which will now be explained with the aid of the flow chart shown in FIG. 5C. On entering the Interval Test Subroutine, a "first time through" flag is set and an inquiry step 110 is executed. Step 110 is similar to the first step 91 of the Full Speed Routine; it looks for interval "X" in the interval counter (33). For the first Interval Test Subroutine 101, a register (referred to as X) is loaded with the number 1 in binary form. If step 110 finds interval 1, a test is made in the next step 111 to see if the first time through flag is set. If so, this flag is cleared and a "one-shot gate pulse" step 112 is executed. The latter step causes a low signal of short duration (e.g., 10 microseconds) to be produced at the output port P1.4 of the microcontroller 20. In FIG. 4 this is illustrated by a block 113 which represents suitable means for supplying a single "1" pulse through the OR circuit 99 to the inverter 100 upon execution of step 112. This initial pulse can occur at any time between succeeding pulses from the generator 98, and it enables the appropriate firing signal(s) to commence almost simultaneously with an interval change in the interval counter (33) without waiting for the next pulse from the generator 98. After step 112 is executed, steps 110 and 111 of the Interval Test Subroutine are automatically repeated so long as interval X continues. Note that once the first time through flag is cleared, the step 111 will determine that this flag is not set and consequently, as indicated in FIG. 5C, the Interval Test Subroutine will thereafter skip the one-shot gate pulse step 112.

As soon as the interval counter (33) advances from interval X to interval X+1, the "No" branch of step 110 in the first Interval Test Subroutine 101 is activated, and the control returns to the next step of the Full Speed Routine. As is indicated in FIG. 5B, the step that follows the subroutine 101 is similar to step 93; a test is made to see if the forward direction flag is true or false. If true, the signal at the output port PA4 is reset to a high level, and the signal at the output port PA5 is set at a low level; if false, the signal at the output port PA6 is reset to a high level and the signal at the output port PA7 is set at a low level. In either case, the control now enters the second Interval Test Subroutine 102 which is the same as the first subroutine 101 (see FIG. 5C) except that the number in the aforesaid X register is incremented by one so that X now equals 2. FIG. 5B shows how the Full Speed Routine continues through the third, fourth, fifth, and sixth Interval Test Subroutines 103, 104, 105, and 106, respectively. At the conclusion of subroutine 106, the last step 115 of the Full Speed Routine is executed and the control is then returned to the Main Routine (FIG. 5A). The last step 115 sets the signal at output port PA0 at a low level and resets the signal at output port PA1 to a high level.

The presently preferred One-Half Speed Firing Routine 81 is shown in FIG. 5D. On entering this routine, the first step 116 is to select the desired gain of the aforesaid amplifier 63 in the voltage regulator 50 (FIG. 2). As was previously explained, the amplifier 63 is connected via line 64 to the microcontroller output port P1.1. The desired gain for half speed operation is achieved, for example, when there is no "1" signal at the port P1.1, and step 116 is effective to clear this signal. The next step 117 assigns the numbers 6, 1 and 3 to three selectable states "J", "K" and "L", respectively, and in the following step 118 the signals at output ports PA0 and PC1 are set at low levels while the signals at all of the other ports PA1 through PA7 and PC0 are high. The control then enters a Skip Cycle Subroutine 119.

The Skip Cycle Subroutine 119 comprises the series of steps that are shown in FIG. 5E. The first step 121 inquires as to the state of the interval counter (reference No. 33 in FIG. 4), and more specifically it looks for interval "J" which, for the first Skip Cycle Subroutine, is interval 6. As soon as the counter advances from interval J-1 to interval J, the second step 122 of the subroutine is executed. The latter step will set the OK-to-ramp flag in a second state referred to as "true," and as a result the microcontroller 20 is able to change the signal at its output port P1.2 from "0" to "1" as soon as the next interrupt is produced by the interval counter. As was previously explained, the port P1.2 is connected via line 69 to the ramp signal generating means 56 in the voltage regulator 50 (FIG. 2). A 0-to-1 transition of the signal on line 69 initiates the active state of the generator 56 and consequently marks the beginning of the first firing window W1 (FIG. 3).

The presently preferred manner of producing the ramp activating signal on line 69 is illustrated in FIG. 4 and will now be briefly described. In FIG. 4 the OK-to-ramp flag is represented as a block 123 which has a high output so long as the flag is set in its true state and a low output when the state of the flag is false. The output of block 123 is fed to the D input of a conventional D-type flipflop device 124. The clock input of the device 124 is connected to the output line 34 of the interval counter 33. After either a 0-to-1 or a 1-to-0 change at its D input, the device 124 will effect a corresponding change at its Q output concurrently with the next interrupt that is supplied over line 34 to its clock input. The Q output of the device 124 is connected to the microcontroller output port P1.2 and hence to the line 69.

Returning to FIG. 5E, the Skip Cycle Subroutine 119 automatically proceeds from step 122 to a second inquiry step 126 which looks for interval "K" in the interval counter (33). K is the interval immediately following J, and it equals 1 for the first subroutine 119 of the One-Half Speed Routine 81. As soon as the counter advances from interval J (=6) to interval K (=1), two more inquiry steps 127 and 128 will be initiated. At the same time, the interrupt that the counter 33 produces on line 34 upon advancing from J to K will start the first firing window W1 in the manner described above.

The inquiry step 127 of the subroutine 119 looks for interval "L" in the interval counter (33). L is the second interval following K, and it equals 3 for the first Skip Cycle Subroutine. Throughout the period of time from the beginning of interval K (=1) to the beginning of interval L (=3), the "No" branch of step 127 activates step 128 which is a duplicate of step 126. Step 128 in turn causes the next step 129 to be performed. Initially, during interval K, the "Yes" branch of step 128 activates step 129 directly, but once the counter advances from interval K to interval K+1, step 129 is activated via the "No" branch of step 128 which first executes a step 130 to return the OK-to-ramp flag to the "false" state. After the latter step is executed the microcontroller 20 will clear the ramp activating signal on the line 69 as soon as the next interrupt is produced on line 34 by the counter (i.e., as soon as the counter advances to interval L). The resulting 1-to-0 transition of the signal on line 69 deactivates the ramp signal generating means 56 (FIG. 2), thereby causing the generator 56 to revert to its quiescent state and marking the end of the first firing window W1.

Step 129 of the Skip Cycle Subroutine (FIG. 5E) performs the same function as the comparator 58 (FIG. 2). It determines whether or not the value of the control signal on line 55 (i.e., the "pedestal") equals or exceeds the value of the ramp signal on line 57. When interval K begins (which coincides with the start of a firing window), the pedestal does not exceed the ramp signal, and steps 127, 128, and 129 of the subroutine 119 are automatically repeated. Subsequently, whenever the declining ramp crosses the pedestal, these two signals will have equal values. At this time a step 132 is executed to set the OK-to-fire flag in its true state which results in the firing enable (FIR) signal being produced at the output port P1.4 of the microcontroller 20 in the previously explained manner (see FIG. 4). At the same time, there is a 1-to-0 transition in the interrupt (INT) signal that the comparator 58 supplies over line 59 to the input port P3.2 of the microcontroller (FIG. 2). In response to such a transition, the microcontroller immediately initiates a low signal of short duration (e.g., approximately 10 microseconds) at its output port P1.4 and then, in effect, disables the INT signal. The presently preferred manner of accomplishing this result is illustrated in FIG. 4 where the line 59 is shown connected via a polarity inverter 134 and a block 135 labeled "One Shot" to the OR logic circuit 99. The block 135 represents suitable means, such as a conventional monostable multivibrator, for producing a single "1" pulse (and hence a "0" signal at the output port P1.4) in response to each 1-to-0 transition of the INT signal on line 59. This initial pulse can occur at any time between succeeded pulses from the 10-KHz generator 98, and it enables the appropriate pair of firing signals to commence almost simultaneously with the moment of equality between the ramp and pedestal without waiting for the next pulse from the generator 98 after the step 132 of the Skip Cycle Subroutine 119 determines that this moment has occurred.

As is indicated in FIG. 5E, after step 132 is initially executed, the steps 127, 128, 129, and 132 of the subroutine 119 are automatically repeated until the interval counter (33) advances from interval L-1 to interval L, at which time a step 136 is executed. The latter step returns the OK-to-fire flag to its false state, and as a result the FIR signal at the microcontroller output port P1.4 is terminated (see FIG. 4). At the same time, the interrupt that the counter produces on line 34 upon advancing to interval L will cause a 1-to-0 transition of the signal on line 69, thereby deactivating the ramp signal generating means 56 and ending the first firing window W1 as previously explained. Following execution of step 136, the control returns to the next step of the One-Half Speed Firing Routine 81.

As is indicated in FIG. 5D, the steps 137 and 138 that follow the first Skip Cycle Subroutine 119 are similar to steps 117 and 118, respectively. But in step 137 the number assigned to the first state "J" equals the number (3) of the last state L in step 117 plus 1, and this time the numbers that are assigned to the states "K" and "L" are 5 and 1, respectively. Step 138 sets the signals at output ports PA1 and PA6 at low levels while resetting the signals at output ports PA0 and PC1. Next, the Skip Cycle Subroutine 119 is executed for a second time. When the control again returns to the One-Half Speed Routine, steps 140 and 141 are executed. Step 140 is similar to step 137; it assigns to the first state "J" the number 2 which equals the number (1) of the last state L in step 137 plus 1, and it consequently assigns the numbers 3 and 5 to the states "K" and "L," respectively. Step 141, which is similar to step 138, sets the signals at output ports PA7 and PC0 at low levels while resetting the signals at output ports PA1 and PA6. Then the control reenters the subroutine 119, and after this subroutine is executed for the third time the control is returned to the Main Routine as shown in FIG. 5A.

Figure 6:
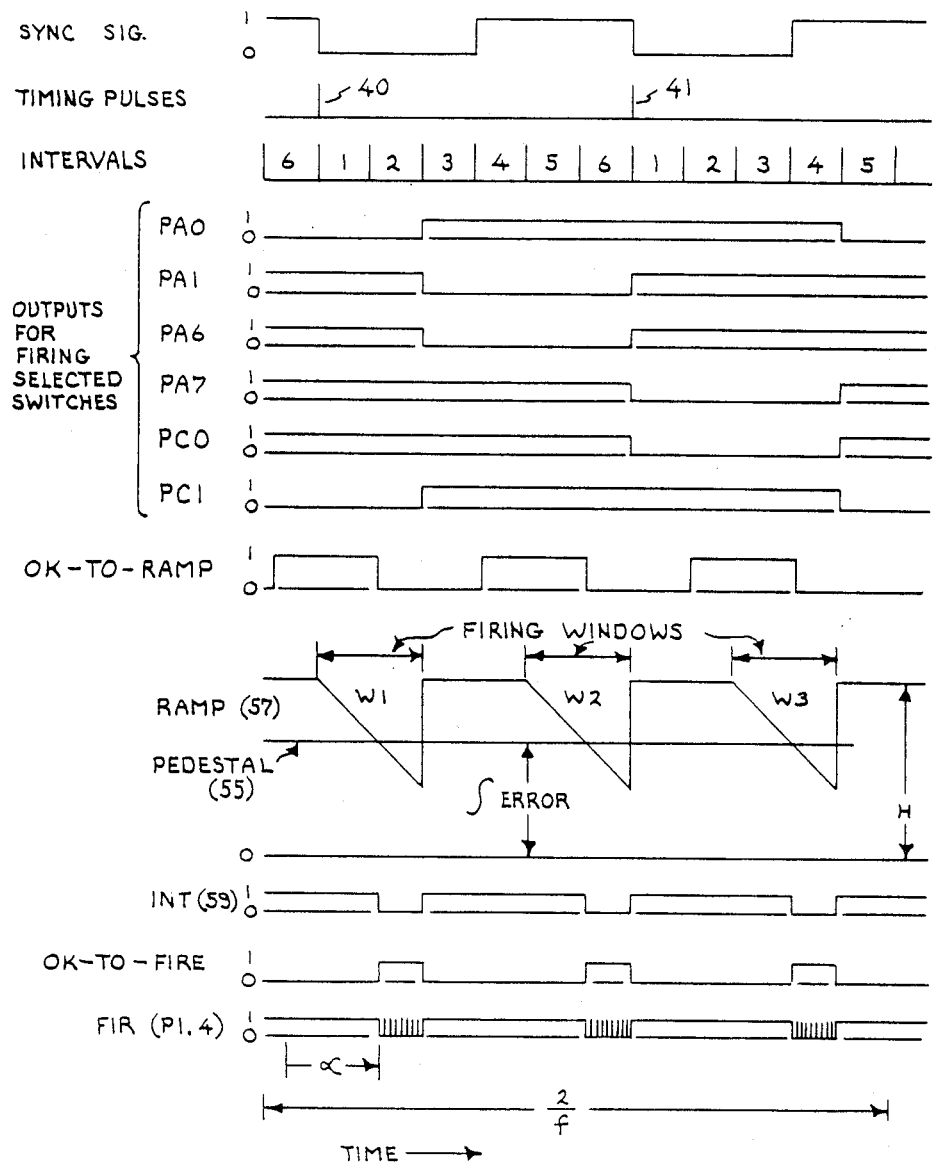
FIG. 6 is a chart illustrating the states of various signals in the FIG. 2 control means during one full cycle of operation at half speed.

From the foregoing description of the One-Half Speed Firing Routine 81, it will now be apparent that 12 consecutive intervals of the interval counter will elapse while this routine is being executed once. In other words, two cycles of the synchronizing (SYNC) signal that is supplied on the input line 24 to the microcontroller 20 are required to complete one cycle of the routine 81. FIG. 6 illustrates typical signals that are produced during one of the recurrent periods of operation of this routine. In FIG. 6 the three false-to-true (0-to-1) transitions of the OK-to-ramp flag are shown occurring in slightly delayed response, respectively, to the interval transitions 5-to-6, 3-to-4, and 1-to-2, in the named sequence, whereas the three true-to-false (1-to-0) transitions of this flag are shown occurring in slightly delayed response, respectively, to the interval transitions 1-to-2, 5-to-6, and 3-to-4, in the named sequence. The activating signal for the ramp generator 56 (FIG. 2) will consequently be produced, in the manner previously explained, throughout the periods coinciding with intervals 1 and 2, 5 and 6, and 3 and 4, in the named sequence. The last-mentioned periods are called firing windows W1, W2, and W3, respectively. It is only during these periods that the ramp signal on line 57 can decline from its quiescent value H and eventually cross the control signal on line 55. The latter signal, which is the integral of the error signal supplied to the integrater 54 (FIG. 2), is labeled "pedestal" in FIG. 6; the higher the pedestal, the earlier it is crossed by the ramp during each firing window. Whenever the pedestal equals or exceeds the ramp, the INT signal from the comparator 58 is 0 and the OK-to-fire flag is in its true ("1") state. In the manner previously explained, the microcontroller 20 produces a train of high-frequency 0 signals (FIR) at its output port P1.4 only while the OK-to-fire flag is in this state. Firing is disabled by a 1 signal at port P1.4.

During the first firing window W1 illustrated in FIG. 6, the signals at output ports PA0 and PC1 are low, and therefore the logic and firing signal generator means 21 (FIG. 2) is effective to produce the pair of firing signals a+ and e− concurrently with the FIR signal at output port P1.4. Actually these firing signals will be intermittent, commonly known as "burst" firing, due to the periodic nature of FIR. The point of time at which the burst commences is delayed, with respect to the immediately preceding zero crossing of the phase A-to-phase B source voltage, by the firing angle α. (Note that such a zero crossing occurs midway through interval 6.) As previously explained, the firing signals a+ and e− turn on the positive-current thyristor in the first switch SA and the negative-current thyristor in the fifth switch SE, respectively (see FIG. 1). Once turned on, these two thyristors will conduct current until their main electrodes become reverse biased. Due to the inductive character of the motor 13, the latter event can occur during interval 4 which begins 30 electrical degrees after the negative-going zero crossing of the phase A-to-phase B source voltage.

During the second firing window W2 shown in FIG. 6, the signals at output ports PA1 and PA6 are low and therefore firing signals a− and d+ are produced concurrently with the FIR signal at output port P1.4. Similarly, during the third firing window W3 the signals at PA7 and PC0 are low and therefore the pair of firing signals e+ and d− are produced concurrently with the FIR signal.

Figure 5F:
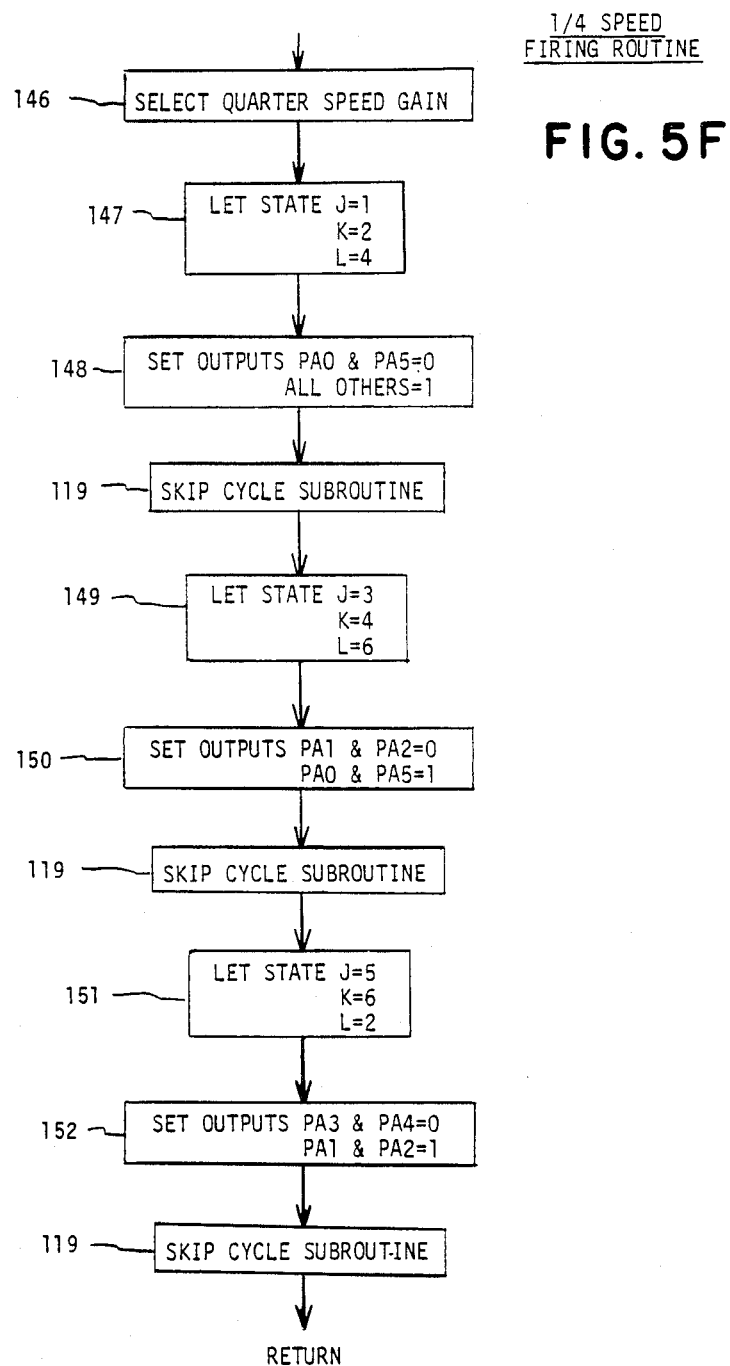

The presently preferred One-Quarter Speed Firing Routine 83 is shown in FIG. 5F and will now be briefly described. Its flow chart is similar to the flow chart of the One-Half Speed Routine. On entering the routine 83, the first step 146 is to select the desired gain of the aforesaid amplifier 63 in the voltage regulator 50 (FIG. 2). This is achieved, for example, by setting the signal at the microcontroller output port P1.1 at a high level ("1"). The next step 147 assigns the numbers 1, 2 and 4 to the three selectable states "J," "K" and "L," respectively, and in the following step 148 the signals at output ports PA0 and PA5 are set at low levels while the signals at all of the other ports PA1 through PA4, PA6, PA7, PC0, and PC1 are high. The control then enters a Skip Cycle Subroutine which is the same as the above-described subroutine 119 illustrated in FIG. 5E. Following execution of the first subroutine 119, the control returns to the next step 149 of the One-Quarter Speed Routine. In step 149, which is similar to step 147, the number assigned to the first state "J" equals the number (4) of the last state L in step 147 minus 1, and the numbers 4 and 6 are assigned to the states "K" and "L," respectively. This is followed by step 150 which sets the signals at output port PA1 and PA2 at low levels while resetting the signals at ports PA0 and PA5. Next, the Skip Cycle Subroutine 119 is executed for the second time, whereupon the control again returns to the One-Quarter Speed Routine and steps 51 and 152 are executed. Step 151 is similar to step 149; it assigns to the first state "J" the number (5) which equals the number (6) of the last state L in step 149 minus 1, and it consequently assigns the numbers 6 and 2 to the states "K" and "L," respectively. Step 152, which is similar to step 150, sets the signals at ports PA3 and PA4 at low levels while resetting the signals at PA1 and PA2. Then the control reenters the subroutine 119, and after this subroutine is executed for the third time the control is returned to the Main Routine as shown in FIG. 5A.

Twenty-four consecutive intervals of the interval counter (33) will elapse while the above-described One-Quarter Speed Firing Routine 83 is being executed once. In other words, four cycles of the SYNC signal that is supplied on the input line 24 to the microcontroller 20 are required to complete one cycle of the routine that is shown in FIG. 5F. In each cycle of the routine 83, there are three separate periods during which the motor speed control system can produce pairs of firing signals. These periods are the firing windows W4, W5, and W6 shown in FIG. 3, and the respective firing signal pairs that are actually produced during such windows are also shown in FIG. 3.

While a preferred embodiment of the invention has been shown and described by way of example, many modifications will undoubtedly occur to persons skilled in the art. The concluding claims are therefore intended to cover all such modifications as fall within the true spirit and scope of the invention.

We claim:

1. A "cycle-skipping" speed control system for a variable speed polyphase a-c electric motor comprising:
   a. a 3-phase source of alternating voltage having a generally sinusoidal waveform, a fundamental frequency of "f" Hertz, and an rms magnitude of "v" volts;
   b. at least three output terminals respectively adapted to be connected to different phases of said motor;
   c. interconnecting means including at least first, second and third controllable bidirectional switches respectively connected between said output terminals and different phases of said source, each of said switches having a non-conducting state, a positive conducting state in which motor current flows through the switch in one direction, and a negative conducting state in which motor current flows through the switch in the opposite direction;
   d. means coupled to preselected phases of said source for providing a train of timing pulses having a frequency that varies with f;
   e. means for providing a speed command signal indicative of whether full motor speed or a fraction "1"/N of full motor speed is desired, where N is a predetermined integer;
   f. means connected to said source and to at least two of said output terminals for producing a control signal representative of any deviation of the rms magnitude of voltage across said output terminals from the product of v times a predetermined proportionality constant; and
   g. control means responsive to said control signal and to said speed command signal for cyclically producing, in synchronism with said timing pulses, a family of periodic firing signals that are effective selectively to initiate the conducting states of said switches, said family comprising six firing signals that respectively commence in a predetermined sequence at approximately 1/6f intervals when full speed is desired, and said control means being arranged, when a predetermined fraction of full speed is desired:
  (1) to predetermine for each desired speed a particular combination and pattern of three different pairs of firing signals per family,
  (2) to establish a series of recurrent periods synchronized with said timing pulses, each period having a duration of approximately N/f,
  (3) to preselect for each desired speed three separate portions of each of said periods during which firing signals can be produced, with only one pair of firing signals being permitted during any one of the preselected portions,
  (4) to produce in turn, during succeeding preselected portions of each period, the predetermined pairs of firing signals, whereby each firing signal in said family is produced at a frequency of f/N Hertz, and
  (5) to advance or to retard, as necessary to minimize said deviation, the time at which each pair of firing signals actually commences during each of said preselected portions of each period.

2. A system as in claim 1, in which said control signal has a value that varies with respect to a predetermined base value as a function of the time integral of said deviation, and in which said control means includes (i) means for producing a prescribed signal, said last-mentioned means having either a quiescent state in which said prescribed signal has a predetermined constant value with respect to said base value or an active state in which the value of said prescribed signal is changing at a predetermined rate, (ii) means responsive to said timing pulses for causing said prescribed signal producing means to be in its active state during each of said three preselected portions of each period, and (iii) means for causing said predetermined pairs of firing signals to commence, in turn, at times when said control signal and said prescribed signal have equal values during succeeding preselected portions of each period.

3. A system as in claim 1, in which said source is an alternating current generator driven by a variable speed prime mover, whereby both f and v are variables.

4. A system as in claim 1, in which said proportionality constant is approximately 1/N.

5. A system as in claim 1, in which the two firing signals that comprise each of said three different pairs of firing signals are produced by said control means concurrently with one another.

6. A system as in claim 5, in which N is either 2 when half speed is desired or 4 when quarter speed is desired.

7. A system as in claim 1, in which each of said bidirectional switches comprises at least one inverse-parallel pair of controllable unidirectional electric valves.

8. A system as in claim 1, in which said timing pulses recur at a frequency of f Hertz, and in which said control means includes means for repetitively measuring the time between successive timing pulses, means for repetitively computing the new average of the measured time and the previously computed average time and for storing said new average, and means for dividing said new average by six so as to establish the duration of each one of six consecutive, substantially equal intervals per cycle of said source voltage, with each of said recurrent periods comprising 6N of said consecutive intervals.

9. A "cycle-skipping" speed control system for a variable speed 3-phase a-c electric motor comprising:
  a. three input terminals respectively adapted to be connected to different phases of a 3-phase source of alternating voltage having a fundamental frequency of "f" Hertz;
  b. three output terminals respectively adapted to be connected to different phases of said motor;
  c. at least ten controllable unidirectional electric valves connected between said input and output terminals with six of said valves being arranged in first, second and third inverse-parallel pairs which respectively connect the three source phases to the corresponding motor phases and with at least four additional valves being arranged to cross-connect at least two of the source and motor phases, each of said valves having turned on (conducting) and turned off (non-conducting) states;
  d. means for providing a speed command signal indicative of whether full motor speed or a fraction "1"/N of full motor speed is desired, where N is a predetermined integer;
  e. means connected to said input terminals for providing a single-phase "square wave" signal which is synchronized with the alternating voltage across two of said input terminals;
  f. reference means connected to at least two of said input terminals for providing a reference signal representative of the alternating voltage across said input terminals;
  g. feedback means connected to at least two of said output terminals for providing a feedback signal representative of the voltage across said output terminals;
  h. summing means connected to said reference means and to said feedback means for deriving a control signal representative of any magnitude error between said reference and feedback signals; and
  i. control means responsive to said control signal and to said speed command signal for cyclically producing, in synchronism with said square wave signal, a family of periodic firing signals that are effective respectively to turn on selected valves, said control means being arranged when full speed is desired to produce a family of six firing signals for turning on, in a predetermined sequence at approximately 1/6f intervals, said six valves, and said control means being further arranged, when a predetermined fraction of full speed is desired:
    (1) to predetermine for each desired speed a particular combination and pattern of three different pairs of firing signals per family,
    (2) to establish a series of recurrent periods synchronized with said square wave signal, each period having a duration of approximately N/f,
    (3) to preselect for each desired speed three separate portions of each of said periods during which said firing signals can be produced, with only one pair of firing signals being permitted during any one of the preselected portions, and
    (4) to produce in turn, only during succeeding preselected portions of each period, the predetermined pairs of firing signals, with each pair actually commencing at a time determined by said control signal.

10. A system as in claim 9, in which said control means includes means responsive to said square wave signal for establishing six consecutive intervals per cycle of said square wave signal, each interval having a duration of approximately 1/6f, and in which each of said recurrent periods comprises 6N of said consecutive intervals.

11. A system as in claim 9, in which said source is an alternating current generator driven by a variable speed prime mover, whereby f is variable and the voltage across said input terminals has a generally sinusoidal waveform.

12. A system as in claim 9, in which said reference means comprises electric rectifying and filtering means, whereby the magnitude of said reference signal is a measure of the average magnitude of the rectified form of said alternating voltage.

13. A system as in claim 12, in which said feedback means includes a rectifier connected between said summing means and at least two of said output terminals.

14. A system as in claim 12, in which said reference means further includes gain means responsive to said speed command signal and effective when a predetermined fraction of full speed is desired to cause said reference signal magnitude to vary with the product of said average magnitude times said fraction.

15. A system as in claim 14, in which said feedback means includes a rectifier having an input and an output, means for connecting said rectifier input to at least two of said output terminals, and means for applying the unfiltered rectified voltage at said rectifier output to said summing means, and in which said summing means includes an integrator having a cross-over frequency appreciably lower than 0.5 f, whereby the value of said control signal varies as a function of the time integral of any error between said reference signal magnitude and the average magnitude of said unfiltered rectified voltage.

* * * * *